BITS FOR PIPE PUNCHES

Original Filed June 24, 1966 2 Sheets-Sheet 1

Inventor:
Arker J. Nielsen, Jr.
By Robert K. Randall,
Attorney

BITS FOR PIPE PUNCHES

Original Filed June 24, 1966 2 Sheets-Sheet 2

Inventor:
Arthur J. Nielsen, Jr.
by Robert K. Randall,
Attorney

United States Patent Office

Re. 27,431
Reissued July 11, 1972

27,431
BITS FOR PIPE PUNCHES

Anker J. Nielsen, Jr., Holden, Mass., assignor to M. B. Skinner Company, Division of Textron Inc.

Original No. 3,411,527, dated Nov. 19, 1968, Ser. No. 560,209, June 24, 1966. Application for reissue Dec. 2, 1970, Ser. No. 94,638
Int. Cl. B23b *41/08;* F16e *41/04*
U.S. Cl. 137—318 32 Claims

Matter enclosed in heavy brackets [ ] appears in the original patent but forms no part of this reissue specification; matter printed in italics indicates the additions made by reissue.

ABSTRACT OF THE DISCLOSURE

A punch T welded to a gas main. Screw-threadedly engaged with the inside of the T is an elongated punching bit having a socket portion at one end for receiving an extension shaft of a ratchet wrench which rotates and feeds the bit into the gas main. The punching bit forms the hole in the gas main by means of a hollow punching end formed as a cam with two lobes on the end opposite the socket portion. Axially spaced from the punching end is a second cam of larger diameter also having two lobes for enlarging the punched hole by a swaging action. A beveled portion of larger diameter than the second cam and spaced axially further in from the punching end than the second cam serves as a valve for shutting off the flow of the gas via the T. The punching bit forms the hole and enlarges it by a punching and swaging action as opposed to a cutting-by-chip-removal action. The thus punched coupon or slug works its way into the bore of the hollow punch end by cold flow of the metal and is packed so tightly in the bore that it is retained with certainty.

The present invention comprises a punching member or bit for use in a punching device or tool of known construction for tapping a gas main, such tool having the form of a T, one leg of which is welded or clamped to an existing gas main in radial relation, to serve first as a screw press punching a hole in the main, and thereafter remaining as a connection or valve admitting gas to a service pipe joined thereto and conducting the gas to the point of its utilization. The punching member or bit is fixed in the end of an arbor which is in screw-threaded engagement with the interior bore of the opposite end of the T from that which is welded to the main, and the bit is forced through the wall of the main by being advanced and rotated by the arbor as the latter is rotated manually through a wrench applied to the arbor.

Since prior devices have needed a very considerable muscular effort to drive the punch cold through the heavy wall of a steel gas main, with the available leverage curtailed by the limitation on the size of the access excavation dictated by economy of labor, a leading object of the present invention has been to make the bit penetrate the main with the expenditure of much less physical effort than required hitherto.

A further object of the invention is to insure the retention by the bit of the slug punched out of the wall of the main in forming the new gas outlet, and to make possible its retraction completely out of the main and T if desired.

Another object of the invention is to form the plowing, kneading, or cold-flow inducing parts of the bit so as to possess sufficient bulk of the component metal stock to resist rounding over and dulling under the intense pressure to which they are subjected in use.

It is an additional object of the invention to devise a bit attaining the foregoing aims economically through admitting of its manufacture by automatic machines and with a minimum of operations.

Other objects of the invention, and the manner of their attainment, are made plain as described hereinafter and as set forth in the claims appended hereto.

An illustrative embodiment of the invention is shown in the accompanying drawings, in which FIG. 1 is an elevation in axial section of a punch T welded to a gas main, with the novel bit in place in the arbor, and a ratchet wrench and extension shaft in place in the socket of the arbor, ready for use.

Figure 1:
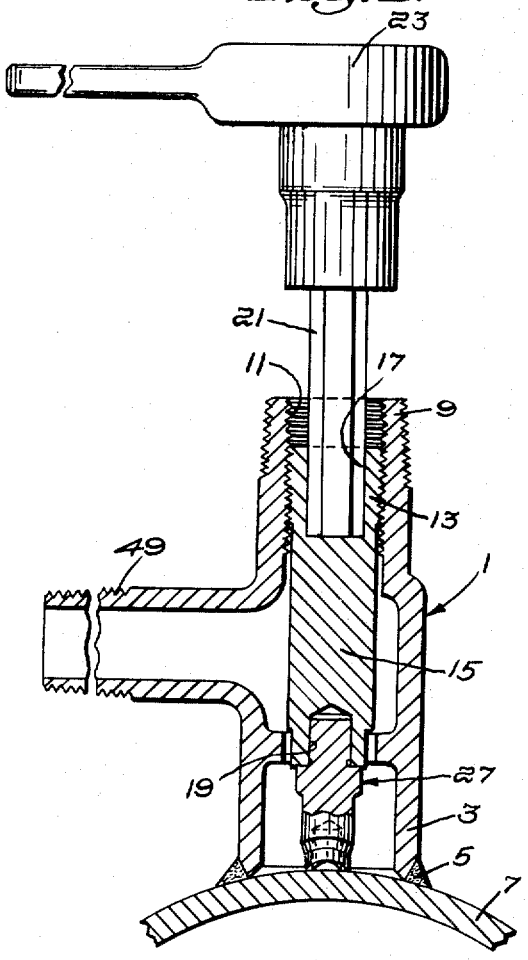
Figure 2:
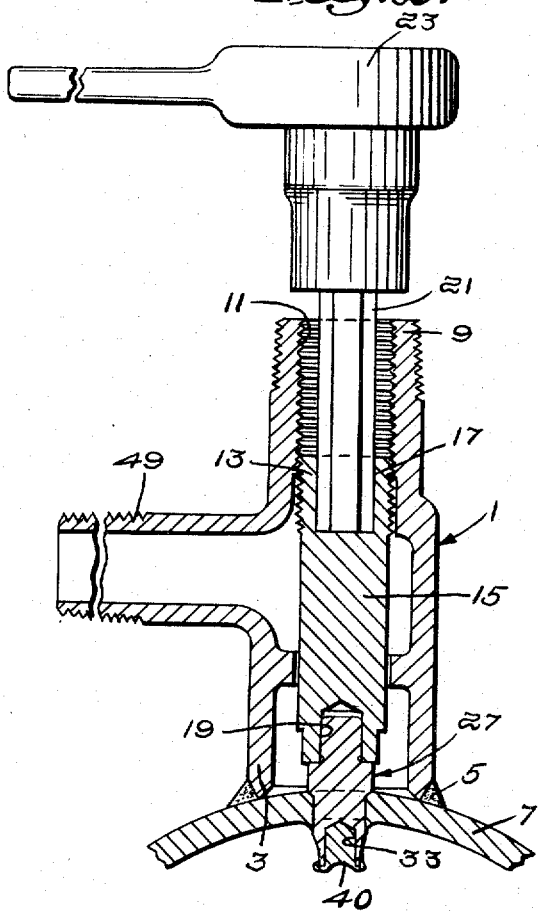
FIG. 2 is a similar view showing the relation of the parts after the bit has formed the hole or port in the gas main.
Figure 3:
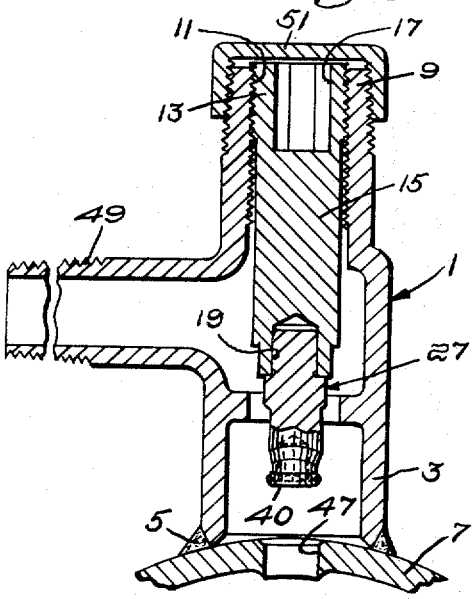
FIG. 3 is a similar view showing the arbor and bit retracted to open the port formed in the main, with the wrench removed, the leg capped and the slug retained in the bit.
Figure 4:
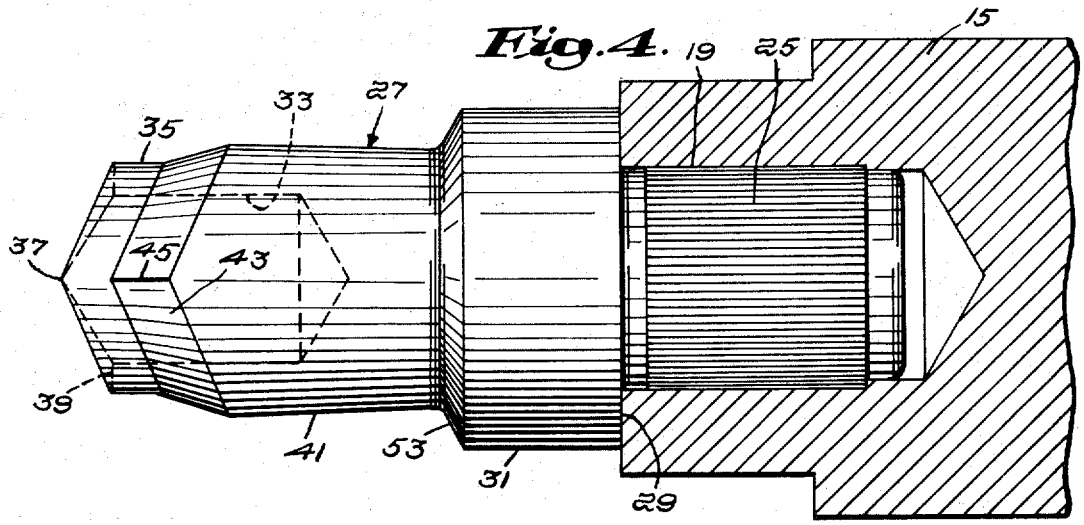
FIG. 4 is an enlarged side elevation of the bit in place in the socket formed for it in the arbor, the latter being in section.

The punch T 1, FIGS. 1–3, is mainly of known construction and form, having one leg 3 welded to the gas main 7 by the bead 5. The opposite end 9 is threaded internally at 11, with a fine thread such as 20 turns to the inch, to receive the correspondingly threaded portion 13 of the arbor 15, the latter having a hexagonal socket 17 in the upper end for the reception of the extension shaft 21 of a ratchet wrench 23.

In the arbor's lower end is formed a fluted socket 19 in which is press-fitted the knurled tang 25 of the novel bit 27, the shoulder 29 of the bit's enlarged portion 31 seating against the end of the arbor. The arbor feeds the bit into the wall of the main 7 as the arbor is advanced by screw thread 11.

Figure 5:
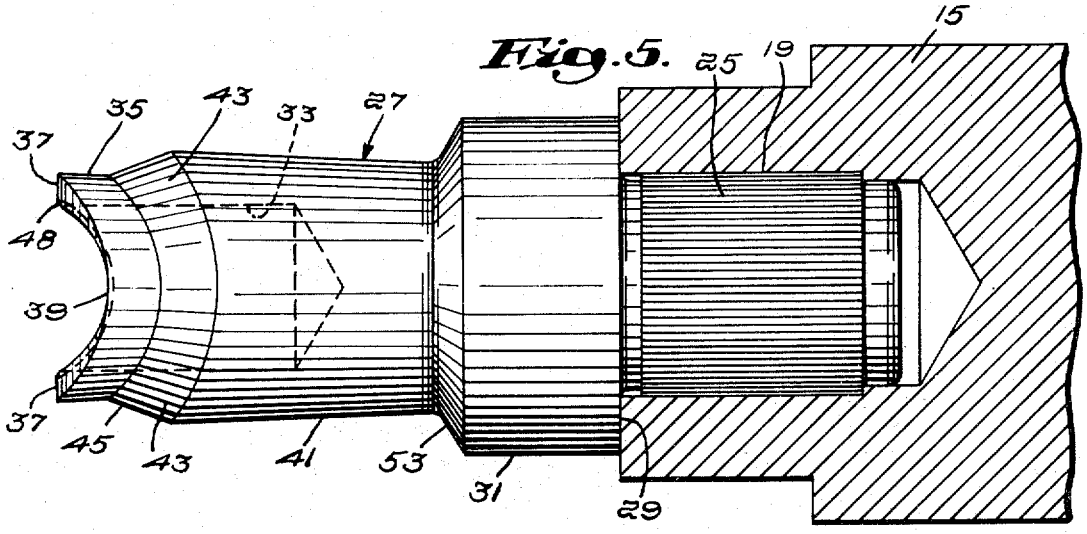
FIG. 5 is a view similar to FIG. 4, which the bit rotated 90° from the position in FIG. 4.
Figure 6:
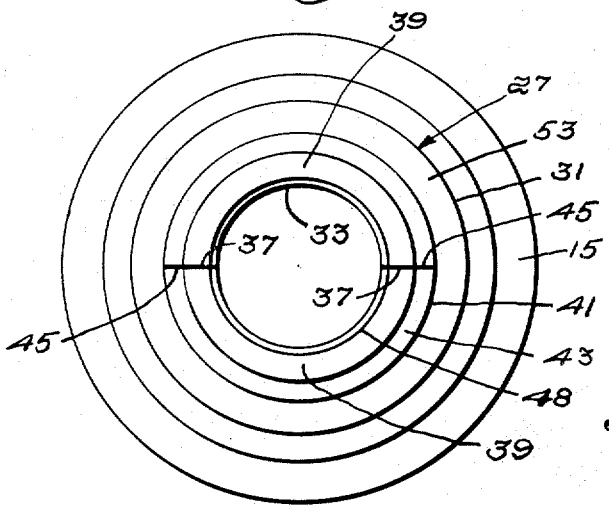
FIG. 6 is an end view of the working end of the bit, still further enlarged.

The working end of the bit 27 is part tubular, being recessed as shown at 33, and the extreme end-portion 35 is formed as a cylindrical cam with two lobes forming apices 37 diametrically apart from each other, each preferably extending raidally inward, at right angles to the axis of the recess. The slopes of the two sides of each lobe meet at the apex 37 to form a sharp dihedral angle, and the end face is at right angles to the bit's axis all the way around, even though it has a rise and fall in an axial direction. Though the peaks 37 are clearly and sharply angular, the valleys 39 are preferably formed on a radius, and hence rounded in side view (FIG. 5).

The end portion 35 performs the initial break-through in the wall of the main 7, and thus may be termed the pilot. The unique formation of its working face just described has the novel action of producing cold flow of the metal of the main, first laterally out of the path of apices 37 till resistance builds up and then onward in the circular path of these apices 37 by a species of kneading and lifting action caused by the alteration of peaks and hollows as the bit revolves and bores deeper into the metal. The divergence of the forces—the resultant of the pressures radially and axially of the bit—within the metal of the main ultimately breaks loose a mushroom-shaped slug 40 with a shank wedged in the bore 33 and a head wider than the diameter of the pilot 35.

The outside wall of the pilot 35 is tapered, with the larger end adjacent to the cams 37, 39. Thus the pilot rotates with minimum friction in the hole it forms in the main 7.

The body portion 41 of the bit is of materially larger diameter than the pilot, and joins it with a taper of around 18° formed with cam lobes 43 which parallel the contour of the face of the pilot—i.e. with peak and valley in phase with those of the pilot's face. These symmetrically developed lobes form sharp dihedral angles 45 in planes intersecting the bit's axis. When this portion of the bit is forced into the hole made by the pilot the hole is enlarged to a diameter exceeding that of the head of the mushroom-shaped ring 40 permitting it to be withdrawn through the hole 47 thus punched in the main, and if desired removed entirely from the T. Like the pilot, the body 41 is tapered reversely to reduce friction, once it passes through the hole.

The kneading action of the high points—peaks—45 of the 18° tapered portion 43 diverts or swages the metal of the main inwardly of the latter and laterally of the hole 47. Since there is no cutting action by either the apices 37 or 45, there are no chips or shavings to fall into the main 7 or get into the service pipe line. All metal removed from the main is comprised within the slug 40, and is permanently retained in the bit 27.

The mouth of the bore 33 in the bit is chamfered slightly at 48; this causes the stem of the slug to be a tight fit in the bore because the chamfer swages the metal of the stem into the bore, packing it in so tightly that it is retained with certainty. Otherwise, with a straight cylindrical bore the stem of the slug is apt to be formed with a lesser diameter than the bore, especially if there is any eccentricity of the arbor when rotated; then it will not be retained.

The advantage of making the surfaces which induce cold flow, or swaging, diverting, kneading, or plowing action, as cam lobes creating sharp dihedral angles but not cutting edges, is the greatly reduced torque load—the markedly greater ease of driving the punch through the main wall 7. The peaks are backed up by ample amounts of solid metal and have only a gradual slope, so that they do not dull or blunt or round over before the punching is completed.

The parts will normally stand in the relation shown in FIG. 3 when in use, with the newly formed port 47 in the main open, a suitable service pipe attached to the lateral outlet 49 of the T, and a pipe cap 51 on the end through which the wrench was applied. However, as shown in FIG. 2, the beveled shoulder 53 of greater radial extent than the second cam will serve to close the port 47 when flow of gas via the T is to be shut off for any reason, the punch T thus performing as a valve.

While I have illustrated and described one form in which the invention may be embodied, I am aware that many modifications may be made therein by any person skilled in the art, without departing from the scope of the invention as expressed in the claims. Therefore, I do not wish to be limited to the particular form shown, or to the details of construction thereof, but what I do claim is:

1. A bit for a pipe punch having a body portion whereby to rotate it and a part-tubular end portion formed with a cam on its open end having a plurality of lobes forming dihedral angles at their apices and with a second cam intermediate the length of this end portion in axially spaced relation to the first cam and of greater radial extent than the first cam.

2. A bit according to claim 1 in which the outside wall of the end portion is of lesser diameter adjacent the second cam than at the end cam.

3. A bit according to claim 2 in which the outside wall is tapered reversely between the said two cams.

4. A bit according to claim 1 in which the second cam is formed on a taper.

5. A bit according to claim 1 in which the end cam has two lobes forming sharp dihedral angles located diametrically apart.

6. A bit according to claim 5 in which the apices forming dihedral angles are aligned with each other.

7. A bit according to claim 6 in which the apices extend radially inward.

8. A bit according to claim 1 in which the end face is at right angles to the bit's axis throughout the entire circuit of the end face.

9. A bit according to claim 5 in which the intervals between the apices of the lobes are of curving contour throughout.

10. A bit according to claim 1 in which the second cam has a plurality of lobes forming dihedral angles at their apices.

11. A bit according to claim 1 in which the body portion has a beveled shoulder of greater radial extent than the second cam.

12. A bit according to claim 1 in which the mouth of the bore of the tubular end is chamfered.

*13. A tapping punch for metal pipe and for forming therefrom and retaining a slug with certainty, said punch having a metal bit with a body portion whereby to rotate it and a part-tubular, open working end portion with a bore for retaining with certainty a slug formed from the metal pipe tapped by the bit, said bit being formed with a first cam portion on its open end having a plurality of swaging lobes forming dihedral angles at their apices, a second cam portion positioned in axially spaced relation to the first cam portion and intermediate the length of said end portion and being of greater radial extent than the first cam portion, the second cam portion being tapered and having at least one lobe forming a dihedral angle at its apex and having an external cross-sectional size and shape sufficient to form an opening that is larger than that swaged by the first cam portion, said second cam portion being axially spaced and separated rearwardly of the mouth of the bore and apices of the first cam portion so as to swage the sides of the opening in a pipe being punched sufficiently large to permit a slug held in said bore, which slug is smaller in cross-section than the opening after being swaged by the second cam portion, to be withdrawn with certainty with the punch through the swaged opening.*

*14. The punch of claim 13 in which said end portion of the bit between the lobes of the first cam portion and the second tapered cam portion is tapered reversely.*

*15. The punch of claim 13 in which the bit has a tapered shoulder of greater radial extent than and positioned rearwardly of the second cam portion, which tapered shoulder serves to close and open the swaged opening when the punch is advanced and retracted.*

*16. The punch of claim 15 in which the bit is tapered reversely between the second cam portion and tapered shoulder.*

*17. A tapping punch for metal pipe and for forming therefrom and retaining a slug with certainty, said punch having a bit with a body portion whereby to rotate it and a part-tubular, open, working end portion with a bore for retaining with certainty a slug formed from the metal pipe tapped by the bit, said slug having, upon being formed, a head portion and a shank portion extending therefrom, said head portion of the slug being of a larger cross-sectional size than said bore and said shank being of a cross-*

*sectional size substantially conforming to that of the bore, said bit being formed with a first cam portion on its open end having a plurality of swaging lobes forming dihedral angles at their apices, a second cam portion positioned in axially spaced relation to the first cam portion and intermediate the length of said end portion and being of greater radial extent than the first cam portion, the second cam portion being tapered and having an external cross-sectional size and shape sufficient to form intentionally an opening that is larger than both the opening swaged by the first cam portion and the head portion of the slug, said second cam portion being axially spaced and separated rearwardly of the mouth of the bore and apices of the first cam portion so as to swage the sides of the opening in a pipe being punched sufficiently large to permit a slug held in said bore, which head portion of the slug is larger in cross-section than the opening swaged by said first cam portion and smaller in cross-section than the opening after being swaged by the second cam portion, to be withdrawn with certainty with the punch through the swaged opening.*

*18. The punch of claim 17 in which said end portion of the bit between the lobes of the first cam portion and the second tapered cam portion is tapered reversely.*

*19. The punch of claim 17 in which said second cam portion has a non-circular external cross sectional shape normal to the axis of the bit.*

*20. The punch of claim 17 in which said second cam portion has a plurality of lobes forming dihedral angles at their apices.*

*21. The punch of claim 17 in which the bit has a tapered shoulder of greater radial extent than and positioned rearwardly of the second cam portion, which tapered shoulder serves to close and open the swaged opening when the punch is advanced and retracted.*

*22. The punch of claim 21 in which the bit is tapered reversely between the second cam portion and tapered shoulder.*

*23. A slug-retaining, pipe tapping assembly for tapping an opening in a metal walled pipe comprising:*

*a punch T adapted to be secured in radial relation to a metal pipe to be tapped, said T having a longitudinally extending leg adapted to be secured to the pipe at the inner end of said leg and having internal threads at the other, outer end of said leg, said T having a laterally extending outlet intermediate said ends of the leg, said outlet being adapted to be attached to a service pipe;*

*a longitudinally extending tapping punch for metal pipe and for forming therefrom and retaining a slug with certainty, said punch having threads at its outer end adapted to threadably engage said internal threads at the outer end of the leg of the T and to permit axial advancement of said punch upon rotation into said pipe to be tapped and withdrawal therefrom upon reverse rotation;*

*said punch having a metal bit with a body portion whereby to rotate it and a part-tubular, open, inner working end portion with a bore for retaining with certainty a slug formed from the metal pipe tapped by the bit, said bit being formed with a first cam portion on its open end having a plurality of swaging lobes forming dihedral angles at their apices, a second cam portion positioned in axially spaced relation to the first cam portion and intermediate the length of said end portion and being of greater radial extent than the first cam portion, the second cam portion being tapered and having at least one lobe forming a dihedral angle at its apex and having an external cross-sectional size and shape sufficient to form intentionally an opening that is larger than that swaged by the first cam portion, said second cam portion being axially spaced and separated rearwardly of the mouth of the bore and apices of the first cam portion so as to swage the sides of the opening in a pipe being punched sufficiently large to permit a slug held in said bore, which slug is smaller in cross-section than the opening after being swaged by the second cam portion, to be withdrawn with certainty with the punch through the swaged opening.*

*24. The slug-retaining, pipe tapping assembly of claim 23 in which said end portion of the bit between the lobes of the first cam portion and the second tapered cam portion is tapered reversely.*

*25. The slug-retaining, pipe tapping assembly of claim 23 in which the bit has a tapered shoulder of greater radial extent than and positioned rearwardly of the second cam portion, which tapered shoulder serves to close and open the swaged opening when the punch is advanced and retracted.*

*26. The slug-retaining, pipe tapping assembly of claim 25 in which the bit is tapered reversely between the second cam portion and tapered shoulder.*

*27. A slug-retaining, pipe tapping assembly for tapping an opening in a metal walled pipe comprising:*

*a punch T adapted to be secured in radial relation to a metal pipe to be tapped, said T having a longitudinally extending leg adapted to be secured to the pipe at the inner end of said leg and having internal threads at the other, outer end of said leg, said T having a laterally extending outlet intermediate said ends of the leg, said outlet being adapted to be attached to a service pipe;*

*a longitudinally extending tapping punch for metal pipe and for forming therefrom and retaining a slug with certainty, said punch having threads at its outer end adapted to threadably engage said internal threads at the outer end of the leg of the T and to permit axial advancement of said punch upon rotation into said pipe to be tapped and withdrawal therefrom upon reverse rotation;*

*said punch having a bit with a body portion whereby to rotate it and a part-tubular, open inner working end portion with a bore for retaining with certainty a slug formed from the metal pipe tapped by the bit, said slug having, upon being formed, a head portion and a shank portion extending therefrom, said head portion of the slug being of a larger cross-sectional size substantially conforming to that of the bore, said bit being formed with a first cam portion on its open end having a plurality of swaging lobes forming dihedral angles at their apices, a second cam portion positioned in axially spaced relation to the first cam portion and intermediate the length of said end portion and being of greater radial extent than the first cam portion, the second cam portion being tapered and having an external cross-sectional size and shape sufficient to form intentionally an opening that is larger than both the opening swaged by the first cam portion and the head portion of the slug, said second cam portion being axially spaced and separated rearwardly of the mouth of the bore and apices of the first cam portion so as to swage the sides of the opening in a pipe being punched sufficiently large to permit a slug held in said bore, which head portion of the slug is larger in cross-section than the opening swaged by said first cam portion and smaller in cross-section than the opening after being swaged by the second cam portion, to be withdrawn with certainty with the punch through the swaged opening.*

*28. The slug-retaining, pipe tapping assembly of claim 27 in which said end portion of the bit between the lobes of the first cam portion and the second tapered cam portion is tapered reversely.*

*29. The slug-retaining, pipe tapping assembly of claim 27 in which said second cam portion of the bit has a non-circular external cross-sectional shape normal to the axis of the bit.*

*30. The slug-retaining, pipe tapping assembly of claim 27 in which said second cam portion of the bit has a plurality of lobes forming dihedral angles at their apices.*

*31. The slug-retaining, pipe tapping assembly of claim 27 in which the bit has a tapered shoulder of greater radial extent than and positioned rearwardly of the second cam portion, which tapered shoulder serves to close and open the swaged opening when the punch is advanced and retracted.*

*32. The slug-retaining, pipe tapping assembly of claim 31 in which the bit is tapered reversely between the second cam portion and tapered shoulder.*

References Cited

The following references, cited by the Examiner, are of record in the patented file of this patent or the original patent.

UNITED STATES PATENTS

| | | | |
|---|---|---|---|
| 3,142,205 | 7/1964 | Hulslander | 137—318 X |
| 3,411,527 | 11/1968 | Nielsen, Jr. | 137—318 |
| 3,606,565 | 9/1971 | Morain et al. | 137—318 X |

M. CARY NELSON, Primary Examiner

D. R. MATTHEWS, Assistant Examiner